United States Patent
Yu et al.

(10) Patent No.: US 9,684,209 B2
(45) Date of Patent: Jun. 20, 2017

(54) CURVED LIQUID CRYSTAL DISPLAY

(71) Applicant: Samsung Display Co., Ltd., Yongin, Gyeonggi-Do (KR)

(72) Inventors: Ha Won Yu, Suwon-si (KR); Tae Kyung Yim, Seoul (KR); Hyun Ho Kang, Ansan-si (KR); O Sung Seo, Seoul (KR); Seung Jun Yu, Suwon-si (KR); Ki Kyung Youk, Bucheon-si (KR); Sang Myoung Lee, Seoul (KR)

(73) Assignee: Samsung Display Co., Ltd. (KR)

( * ) Notice: Subject to any disclaimer, the term of this patent is extended or adjusted under 35 U.S.C. 154(b) by 148 days.

(21) Appl. No.: 14/635,917

(22) Filed: Mar. 2, 2015

(65) Prior Publication Data
US 2016/0091743 A1    Mar. 31, 2016

(30) Foreign Application Priority Data
Sep. 30, 2014 (KR) ........................ 10-2014-0131050

(51) Int. Cl.
*G02F 1/1333* (2006.01)
*G02F 1/1339* (2006.01)

(52) U.S. Cl.
CPC ...... *G02F 1/1339* (2013.01); *G02F 1/133305* (2013.01); *G02F 2001/133368* (2013.01)

(58) Field of Classification Search
None
See application file for complete search history.

(56) References Cited

U.S. PATENT DOCUMENTS

| 5,828,435 | A * | 10/1998 | Kato | G02F 1/1339 349/153 |
| 9,316,876 | B2 * | 4/2016 | Mo | G02F 1/13458 |
| 2003/0123019 | A1 * | 7/2003 | Kim | G02F 1/133305 349/158 |
| 2007/0177092 | A1 * | 8/2007 | Hosoya | G02F 1/1345 349/149 |
| 2009/0213319 | A1 * | 8/2009 | Sasaki | G02F 1/1303 349/189 |
| 2009/0290117 | A1 * | 11/2009 | Watanabe | G02F 1/133305 349/153 |

(Continued)

FOREIGN PATENT DOCUMENTS

| JP | 2011-014024 A | 1/2011 |
| KR | 10-2008-0001137 A | 1/2008 |
| KR | 10-2012-0013265 A | 2/2012 |

*Primary Examiner* — Ryan Crockett
(74) *Attorney, Agent, or Firm* — Innovation Counsel LLP

(57) ABSTRACT

A curved liquid crystal display according to an exemplary embodiment of the present system and method includes: a first substrate; a first thin film display layer disposed at an upper surface of the first substrate; a second substrate; a second thin film display layer disposed at a lower surface of the second substrate; a sealant disposed at an edge of the first substrate and the second substrate; and a liquid crystal layer disposed between the first substrate and the second substrate and sealed by the sealant, wherein the first thin film display layer and the second thin film display layer face each other, the first substrate and the second substrate are curved to have the same degree of curvature, and a thickness of a side surface of the second substrate is thinner than a thickness of a center portion of the second substrate.

11 Claims, 8 Drawing Sheets

(56) References Cited

U.S. PATENT DOCUMENTS

| | | | | |
|---|---|---|---|---|
| 2012/0202030 | A1* | 8/2012 | Kondo | B32B 17/06 428/215 |
| 2013/0016308 | A1* | 1/2013 | Urayama | G02F 1/13394 349/61 |
| 2013/0170013 | A1* | 7/2013 | Tonar | B60R 1/088 359/296 |
| 2013/0271710 | A1* | 10/2013 | Tatemura | G02F 1/133512 349/110 |
| 2014/0055836 | A1* | 2/2014 | Cammenga | B60R 1/088 359/267 |
| 2014/0092356 | A1* | 4/2014 | Ahn | G02F 1/1339 349/153 |
| 2014/0160694 | A1* | 6/2014 | Yoon | G02F 1/1303 361/749 |
| 2014/0168152 | A1* | 6/2014 | Ishizaki | G06F 3/044 345/174 |
| 2014/0204293 | A1* | 7/2014 | Kim | G02F 1/133351 349/15 |
| 2015/0036094 | A1* | 2/2015 | Lee | G02F 1/1333 349/158 |
| 2015/0044931 | A1* | 2/2015 | Mo | G02F 1/1393 445/6 |

* cited by examiner

1000

(a)

(b)

CURVED LIQUID CRYSTAL DISPLAY

CROSS-REFERENCE TO RELATED APPLICATION

This application claims priority to and the benefit of Korean Patent Application No. 10-2014-0131050 filed in the Korean Intellectual Property Office on Sep. 30, 2014, the entire contents of which are incorporated herein by reference.

BACKGROUND (a) Related Field

The present system and method relate to a curved liquid crystal display.

(b) Description of the Related Art

A liquid crystal display (LCD), which may be used in a flat panel display device, generally includes two display panels where field generating electrodes such as a pixel electrode and a common electrode are formed, and a liquid crystal layer interposed between the two display panels.

The liquid crystal display operates by generating electric fields in the liquid crystal layer by applying voltages to the field generating electrodes. Specifically, the electric fields determine the arrangement and/or orientations of the liquid crystal molecules in the liquid crystal layer and, thereby, the polarization of incident light being transmitted by the liquid crystal layer. By controlling the electric field that is applied to each pixel in the liquid crystal display, an image may be displayed.

As LCDs become larger, curved display panels have been developed to enhance immersion and realism for its users. However, when the display panels are curved, a stress to the substrate may occur and cause stains in the image being displayed. As a result, the image quality of the display may be deteriorated.

SUMMARY

The present system and method prevent deterioration of the display quality in a curved liquid crystal display.

A curved liquid crystal display according to an exemplary embodiment of the present system and method includes: a first substrate; a first thin film display layer disposed at an upper surface of the first substrate; a second substrate; a second thin film display layer disposed at a lower surface of the second substrate; a sealant disposed at an edge of the first substrate and the second substrate; and a liquid crystal layer disposed between the first substrate and the second substrate and sealed by the sealant, wherein the first thin film display layer and the second thin film display layer face each other, the first substrate and the second substrate are curved to have the same degree of curvature, and a thickness of a side surface of the second substrate is thinner than a thickness of a center portion of the second substrate.

The thickness of the side surface of the second substrate may be thinner than the thickness of the center portion of the second substrate by 40% to 60%.

The second substrate may include a first upper removed portion disposed at an edge.

The first upper removed portion may extend from an upper surface of the second substrate to the side surface of the second substrate.

The sealant may be disposed below the first upper removed portion.

A thickness of a side surface of the first substrate may be thinner than a thickness of a center portion of the first substrate.

The first substrate may include a first lower removed portion disposed at an edge.

The first lower removed portion may extend from a lower surface of the first substrate to the side surface of the first substrate.

The sealant may be disposed between the first upper removed portion and the first lower removed portion.

The second substrate may further include a second lower removed portion facing the first upper removed portion.

The second lower removed portion may extend from the lower surface of the second substrate to the side surface of the second substrate.

The first substrate may further include a second upper removed portion facing the first lower removed portion.

The second upper removed portion may extend from the upper surface of the first substrate to the side surface of the first substrate.

The sealant may contact the second upper removed portion and the second lower removed portion.

In the curved liquid crystal display according to an exemplary embodiment of the present system and method, the thickness of the substrate at the edge portion is thinner than the thickness of the substrate at the center portion such that stains may be reduced at the four corners of the curved liquid crystal display, thereby preventing image quality deterioration in the curved liquid crystal display.

DETAILED DESCRIPTION OF THE EMBODIMENTS

Figure 1:
FIG. 1 is a schematic view of a curved liquid crystal display, according to an exemplary embodiment of the present system and method.
Figure 1:

The present system and method are described hereinafter with reference to the accompanying drawings that show exemplary embodiments of the system and method. However, the present system and method are not limited to the exemplary embodiments described herein, and may be implemented in various different forms. Those of ordinary skill in the art would appreciate that the described embodiments may be modified in various different ways without departing from the spirit or scope of the present system and method.

In the drawings, the thickness of layers, films, panels, regions, etc., are exaggerated for clarity. It is understood that when an element such as a layer, film, region, or substrate is referred to as being "on" another element, it may be directly on the other element, or intervening elements may also be present. Like reference numerals designate like elements throughout the specification.

A curved liquid crystal display according to an exemplary embodiment of the present system and method is described with reference to FIG. 1 to FIG. 4.

Figure 2:
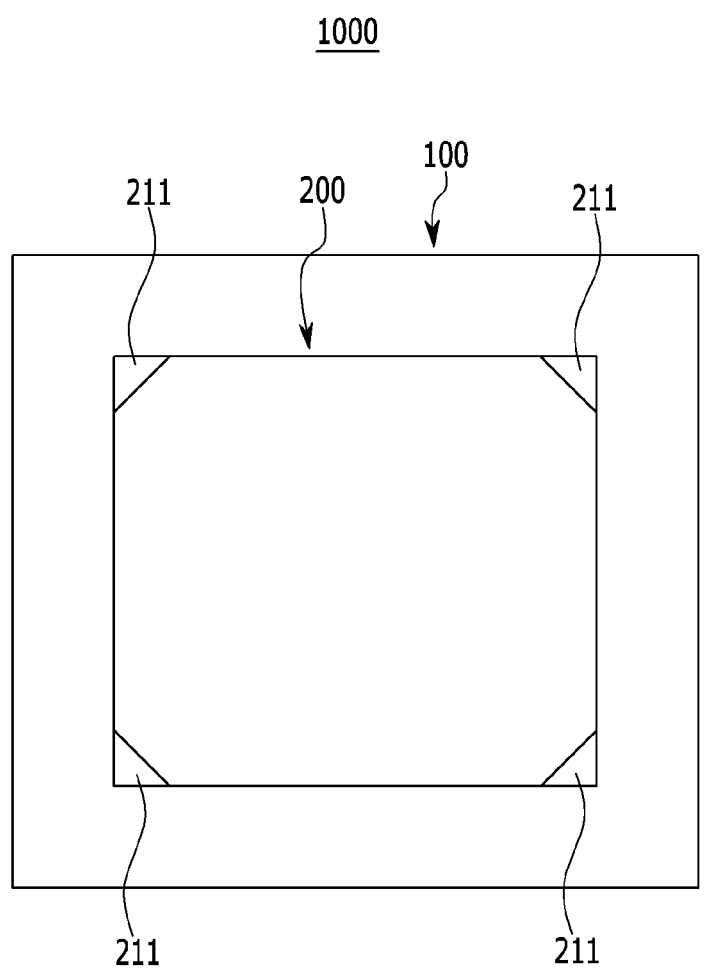
FIG. 2 is a schematic top plan view of the curved liquid crystal display of FIG. 1, according to an exemplary embodiment of the present system and method.
Figure 3:
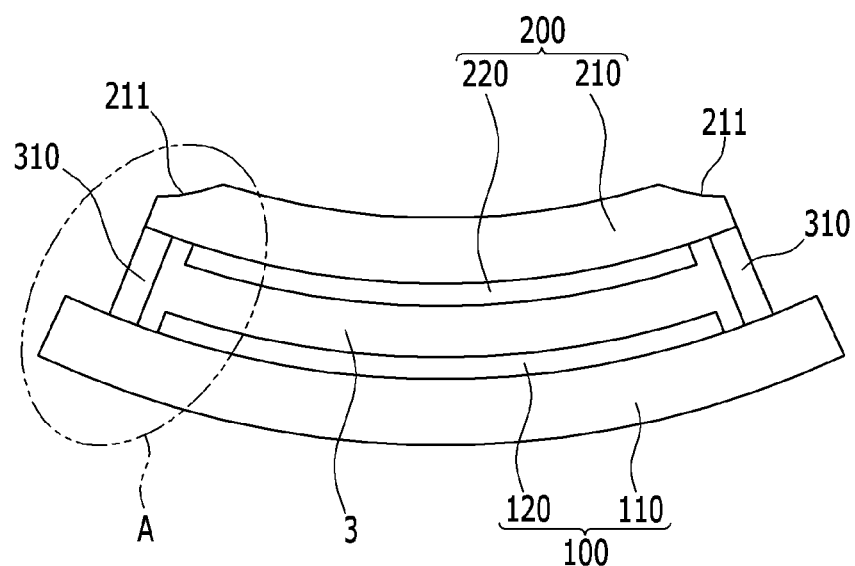
FIG. 3 is a schematic cross-sectional view of the curved liquid crystal display shown in FIG. 1.
Figure 4:
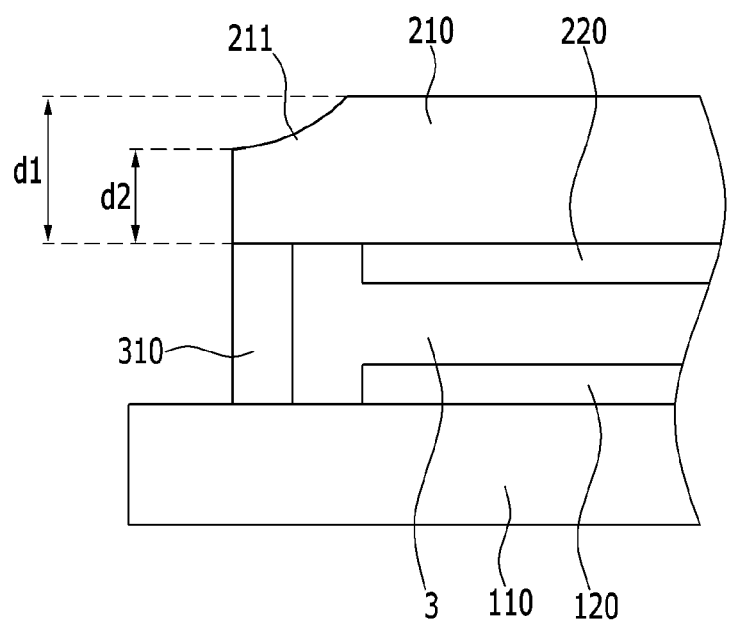
FIG. 4 is an enlarged view of a portion A of FIG. 3.

FIG. 1 is a schematic view of a curved liquid crystal display, according to an exemplary embodiment of the present system and method. FIG. 2 is a schematic top plan view of the curved liquid crystal display of FIG. 1. FIG. 3 is a schematic cross-sectional view of the curved liquid crystal display shown in FIG. 1. FIG. 4 is an enlarged view of a portion A of FIG. 3.

Referring to FIG. 1, a curved liquid crystal display 1000 according to an exemplary embodiment may be (a) configured such that a surface for displaying an image is concaved with the sides of the display curving towards a viewer of the display, or (b) configured such that the surface for displaying an image is convexed with the sides of the display curving away from the view.

The curved liquid crystal display 1000 in configuration (a) in which the surface for displaying an image is concaved with the sides of the display curving towards the viewer is described below with reference to FIG. 2 to FIG. 4.

Referring to FIG. 2 to FIG. 4, the curved liquid crystal display 1000 according to an exemplary embodiment includes a first display panel 100 and a second display panel 200 facing each other, and a liquid crystal layer 3 disposed between the first and second display panels 100 and 200.

The first display panel 100 and the second display panel 200 are combined using a sealant 310, which also seals the liquid crystal layer 3 between the first substrate 110 and the second substrate 210. The first display panel 100 includes a first substrate 110 and a first thin film display layer 120. As FIG. 3 shows, the first thin film display layer 120 is disposed at the upper (orientation relative to the figures shown) surface of the first substrate 110 facing the liquid crystal layer 3.

The first thin film display layer 120 may include a gate line, a data line, a thin film transistor, and a pixel electrode (not shown). As an example, the data line may be connected to a source terminal of the thin film transistor, the gate line may be connected to a gate terminal of the thin film transistor, and the pixel electrode may be connected to a drain terminal of the thin film transistor.

The second display panel 200 includes a second substrate 210 and a second thin film display layer 220 disposed at the lower surface of the second substrate 210 facing the liquid crystal layer 3. The first thin film display layer 120 and the second thin film display layer 220 face each other with the liquid crystal layer 3 interposed in between.

The second substrate 210 includes a first upper removed portion 211 disposed at an edge. More particularly, the first upper removed portion 211 is disposed at each of the four corners of the second substrate 210, as shown in FIG. 2. However, the present system and method are not limited thereto. For example, the first upper removed portion 211 may be disposed between the corners of the second substrate 210.

Accordingly, as FIG. 4 shows, a thickness d2 of a side surface of the second substrate 210 is thinner than a thickness d1 of the center portion of the second substrate 210. In an exemplary embodiment, the thickness d2 of the side surface of the second substrate 210 is thinner than the thickness d1 of the center portion of the second substrate 210 by 40% to 60%. The first upper removed portion 211 extends from the upper surface of the second substrate 210 (i.e., surface facing away from the liquid crystal layer 3) to the side surface of the second substrate 210.

The second thin film display layer 220 may include a color filter (not shown) that transmits light of a particular color, and a common electrode (not shown). However, the present system and method are not limited thereto. For example, the color filter or the common electrode may be disposed on the first substrate 110.

The first substrate 110 and the second substrate 210 may have a predetermined curvature. In the case of FIG. 3, the substrates curve concavely in a horizontal direction such that, when the viewer is facing the upper surface of the second display panel 200 and viewing an image displayed by the curved liquid crystal display 1000, the left and right sides (relative to the viewer) of the substrates are curved towards the viewer.

The sealant 310 is disposed at the edges of the first substrate 110 and the second substrate 210. In the case of FIG. 3, the sealant 310 is positioned below the first upper removed portion 211.

Generally, when a curved liquid crystal display is curved in the manner shown in FIG. 3, and the first display panel and the second display panel are combined by a sealant, stress is applied to areas of the first substrate and the second substrate close to the sealant. The stress causes the distance between the first substrate and the second substrate near the sealant to increase, and as a result, the liquid crystal material of the liquid crystal layer 3 gather near the sealant. This gathering of the liquid crystal material, in turn, causes staining of the display, especially at the four corner portions of the curved liquid crystal display.

However, in the above-described exemplary embodiment shown in FIGS. 1 to 4, because the thickness d2 of the side surface of the second substrate 210 is thinner than the thickness d1 of the center portion of the second substrate 210 by, for example, 40% to 60%, the generation of the stains is reduced in the four corner portions of the curved liquid crystal display 1000.

Figure 5:
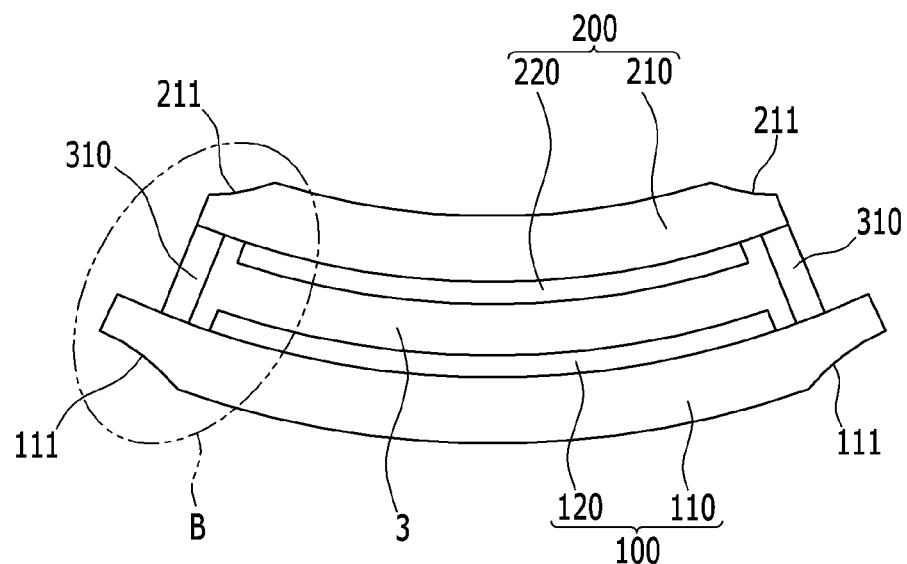
FIG. 5 is a schematic cross-sectional view of a curved liquid crystal display, according to another exemplary embodiment of the present system and method.
Figure 6:
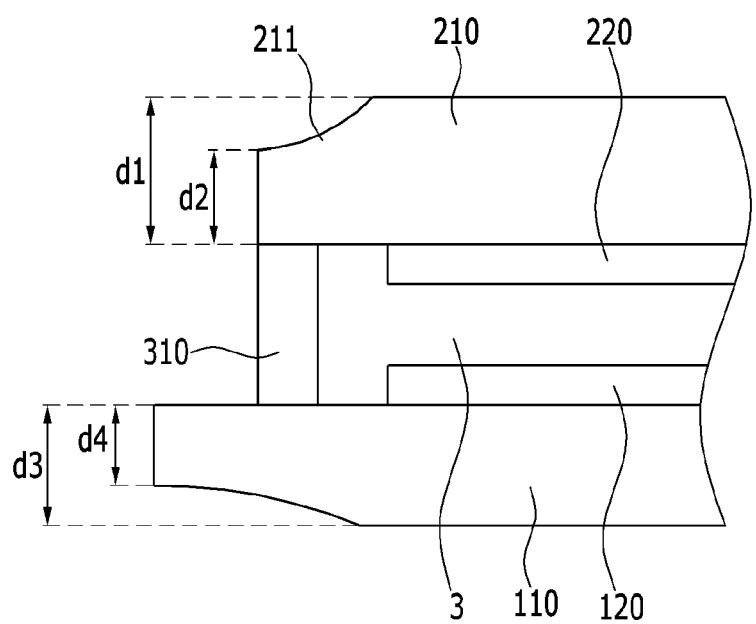
FIG. 6 is an enlarged view of a portion B of FIG. 5.

A curved liquid crystal display according to another exemplary embodiment of the present system and method are described below with reference to FIG. 5 and FIG. 6. FIG. 5 is a schematic cross-sectional view of a curved liquid crystal display, according to an exemplary embodiment of the present system and method. FIG. 6 is an enlarged view of a portion B of FIG. 5.

Referring to FIGS. 5 and 6, the curved liquid crystal display 1000 has a concave shape such that the left and right sides of the surface displaying an image curve towards the viewer. The curved liquid crystal display 1000 includes a first display panel 100 and a second display panel 200 facing to each other, and a liquid crystal layer 3 disposed between the first and second display panels 100 and 200.

The first display panel 100 and the second display panel 200 are combined using a sealant 310, which seals the liquid crystal layer 3 between the first substrate 110 and the second substrate 210.

The first display panel 100 includes a first substrate 110 and a first thin film display layer 120. As FIG. 5 shows, the first thin film display layer 120 is disposed at the upper surface of the first substrate 110 facing the liquid crystal layer 3.

The first substrate 110 includes a first lower removed portion 111 disposed at an edge. More particularly, the first lower removed portion 111 is disposed at each of the four corners of the first substrate 110. However, the present system and method are not limited thereto. For example, the first lower removed portion 111 may also be disposed between the corners of the first substrate 110.

Accordingly, as FIG. 6 shows, a thickness d4 of a side surface of the first substrate 110 is thinner than a thickness d3 of the center portion of the first substrate 110. In an exemplary embodiment, the thickness d4 of the side surface of the first substrate 110 is thinner than the thickness d3 of the center portion of the first substrate 110 by 40% to 60%. The first lower removed portion 111 extends to the side surface of the first substrate 110 from the lower surface of the first substrate 110.

Like the embodiment of FIG. 3, the first thin film display layer 120 may include a gate line, a data line, a thin film transistor, and a pixel electrode (not shown). The data line may be connected to the source terminal of the thin film transistor, the gate line may be connected to the gate terminal of the thin film transistor, and the pixel electrode may be connected to the drain terminal of the thin film transistor.

The second display panel 200 includes a second substrate 210 and a second thin film display layer 220 disposed at the lower surface of the second substrate 210 facing the liquid crystal layer 3. The first thin film display layer 120 and the second thin film display layer 220 face each other with the liquid crystal layer 3 interposed in between.

The second substrate 210 includes a first upper removed portion 211 disposed at an edge. More particularly, the first upper removed portion 211 is disposed at each of the four corners of the second substrate 210. However, the present system and method are not limited thereto. For example, the first upper removed portion 211 may be disposed between the corners of the second substrate 210.

Accordingly, as FIG. 6 shows, a thickness d2 of an edge of the second substrate 210 is thinner than a thickness d1 of the other portions of the second substrate 210. In an exemplary embodiment, the thickness d2 of the edge is thinner than the thickness d1 of the other portions by 40% to 60%. The first upper removed portion 211 extends from the upper surface of the second substrate 210 to the side surface of the second substrate 210.

The second thin film display layer 220 may include a color filter (not shown) that transmits light passing of a particular color, and a common electrode (not shown). However, the present system and method are not limited thereto. For example, the color filter or the common electrode may be disposed on the first substrate 110.

The first substrate 110 and the second substrate 210 may have a predetermined curvature. In the case of FIG. 5, the substrates curve concavely in a horizontal direction such that, when the viewer is facing the upper surface of the second display panel 200 and viewing an image displayed by the curved liquid crystal display 1000, the left and right sides of the substrates are curved towards the viewer.

The sealant 310 is disposed at the edges of the first substrate 110 and the second substrate 210. In the case of FIG. 5, the sealant 310 is positioned between the first upper removed portion 211 and the first lower removed portion 111.

Figure 7:
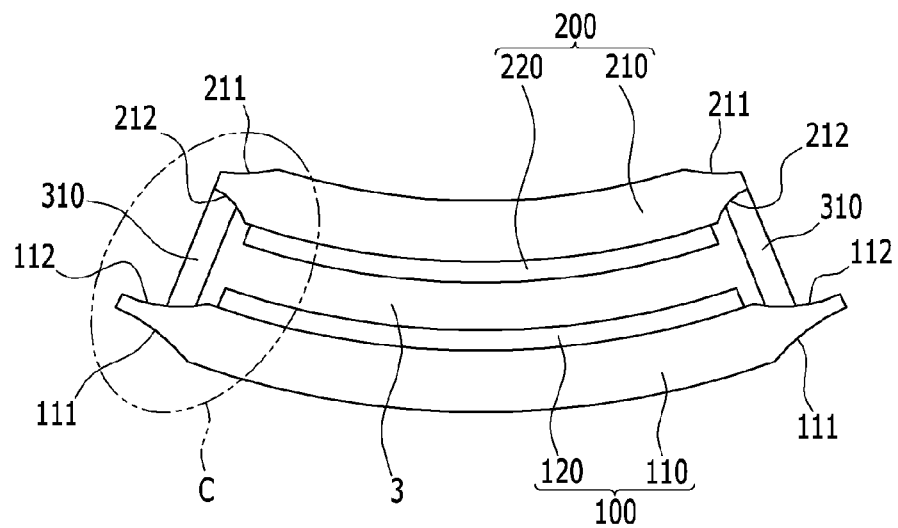
FIG. 7 is a schematic cross-sectional view of a curved liquid crystal display, according to another exemplary embodiment of the present system and method.
Figure 8:
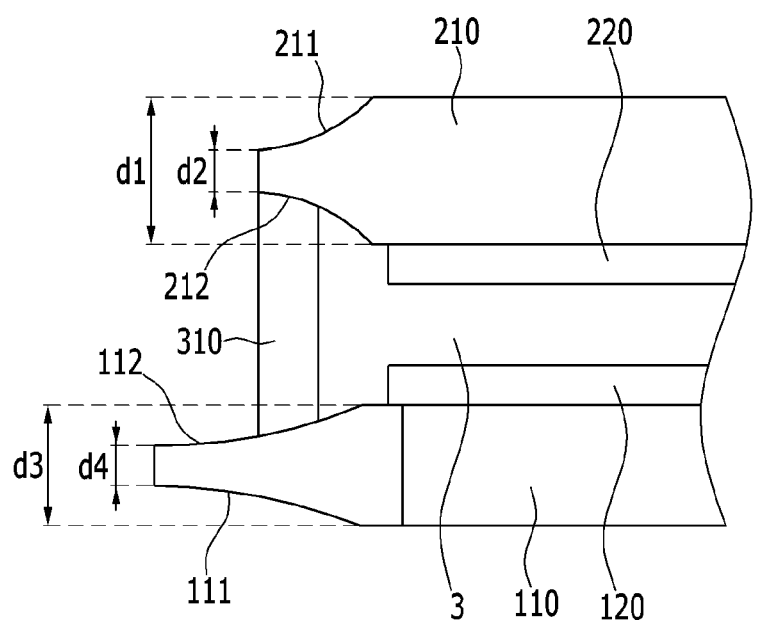
FIG. 8 is an enlarged view of a portion C of FIG. 7.

A curved liquid crystal display according to another exemplary embodiment of the present system and method are described below with reference to FIG. 7 and FIG. 8. FIG. 7 is a schematic cross-sectional view of a curved liquid crystal display, according to an exemplary embodiment of the present system and method. FIG. 8 is an enlarged view of a portion C of FIG. 7.

Referring to FIGS. 7 and 8, the curved liquid crystal display 1000 has a concave shape such that the left and right sides of the surface displaying an image curve towards the viewer. The curved liquid crystal display 1000 includes a first display panel 100 and a second display panel 200 facing each other, and a liquid crystal layer 3 disposed between the first and second display panels 100 and 200.

The first display panel 100 and the second display panel 200 are combined using a sealant 310, which seals the liquid crystal layer 3 between the first substrate 110 and the second substrate 210.

The first display panel 100 includes a first substrate 110 and a first thin film display layer 120. As FIG. 7 shows, the first thin film display layer 120 is disposed at the upper surface of a first substrate 110 facing the liquid crystal layer 3.

The first substrate 110 includes a first lower removed portion 111 and a second upper removed portion 112 disposed at an edge. More particularly, the first lower removed portion 111 and the second upper removed portion 112 are disposed at each of the four corners of the first substrate 110. However, the present system and method are not limited thereto. For example, the first lower removed portion 111 and the second upper removed portion 112 may also be disposed between the corners of the first substrate 110.

Accordingly, as FIG. 8 shows, a thickness d4 of a side surface of the first substrate 110 is thinner than a thickness d3 of the center portion of the first substrate 110. In an exemplary embodiment, the thickness d4 of the side surface of the first substrate 110 is thinner than the thickness d3 of the center portion of the first substrate 110 by 40% to 60%. The first lower removed portion 111 extends to the side surface of the first substrate 110 from the lower surface of the first substrate 110. The second upper removed portion 112 extends from the upper surface of the first substrate 110 to the side surface of the first substrate 110. Also, the first lower removed portion 111 and the second upper removed portion 112 overlap each other when viewed from a direction normal to the upper surface of the first substrate 110.

The first thin film display layer 120 may include a gate line, a data line, a thin film transistor, and a pixel electrode. The data line may be connected to a source terminal of the thin film transistor, the gate line may be connected to a gate terminal of the thin film transistor, and the pixel electrode may be connected to a drain terminal of the thin film transistor.

The second display panel 200 includes a second substrate 210 and a second thin film display layer 220 disposed at the lower surface of the second substrate 210 facing the liquid crystal layer 3. The first thin film display layer 120 and the second thin film display layer 220 face each other with the liquid crystal layer 3 interposed in between.

The second substrate 210 includes a first upper removed portion 211 and a second lower removed portion 212 disposed at an edge. More particularly, the first upper removed portion 211 and the second lower removed portion 212 are disposed at each of the four corners of the second substrate 210. However, the present system and method are not limited thereto. For example, the first upper removed portion 211 and the second lower removed portion 212 may be disposed between the corners of the second substrate 210.

Accordingly, as FIG. 8 shows, a thickness d2 of an edge of the second substrate 210 is thinner than a thickness d1 of the other portions of the second substrate 210. In an exemplary embodiment, the thickness d2 of the edge is thinner than the thickness d1 of the other portions by 40% to 60%. The first upper removed portion 211 extends from the upper surface of the second substrate 210 to the side surface of the second substrate 210. The second lower removed portion 212 extends from the lower surface of the second substrate 210 to the side surface of the second substrate 210. Also, the first upper removed portion 211 and the second lower removed portion 212 overlap each other when viewed from a direction normal to the upper surface of the second substrate 210.

The second thin film display layer 220 may include a color filter (not shown) that transmits light of a particular color, and the common electrode (not shown). However, the present system and method are not limited thereto. For example, the color filter or the common electrode may be disposed on the first substrate 110.

The first substrate 110 and the second substrate 210 may have a predetermined curvature. In the case of FIG. 7, the substrates curve concavely in a horizontal direction such that, when the viewer is facing the upper surface of the second display panel 200 and viewing an image displayed by the curved liquid crystal display 1000, the left and right sides of the substrates are curved towards the viewer.

The sealant 310 is disposed at the edge of the first substrate 110 and the second substrate 210. In the case of FIG. 7, the sealant 310 contacts the second lower removed portion 212 and the second upper removed portion 112.

As described above, the thickness of the portion of the first substrate 110 and the second substrate 210 near the sealant 310 (e.g., the four corners of the first substrate 110 and the second substrate 210) is thinner than the center portion of the first substrate 110 and the second substrate 210. As such, the occurrence of stains may be reduced at the four corners of the curved liquid crystal display 1000.

While the present system and method are described above in connection with exemplary embodiments, the present system and method are not limited to the disclosed embodiments. On the contrary, those of ordinary skill in the are would understand that the present system and method encompasses various modifications and equivalent arrangements thereof.

| <Description of symbols> | |
|---|---|
| 110: first substrate | 111: first lower removed portion |
| 112: second upper removed portion | 120: thin film display layer |
| 210: second substrate | 211: first upper removed portion |
| 212: second lower removed portion | 220: second thin film display layer |
| 310: sealant | |

What is claimed is:

1. A curved liquid crystal display comprising:
a first substrate;
a first thin film display layer disposed at an upper surface of the first substrate;
a second substrate;
a second thin film display layer disposed at a lower surface of the second substrate;
a sealant disposed at an edge of the first substrate and the second substrate; and
a liquid crystal layer disposed between the first substrate and the second substrate and sealed by the sealant,
wherein the first thin film display layer and the second thin film display layer face each other, the first substrate and the second substrate are curved to have the same degree of curvature, and a thickness of a side surface of the second substrate is thinner than a thickness of a center portion of the second substrate,
wherein the second substrate includes a first upper removed portion disposed at an edge, the first substrate includes a first lower removed portion disposed at an edge, the sealant is disposed between the first upper removed portion and the first lower removed portion.

2. The curved liquid crystal display of claim 1, wherein the thickness of the side surface of the second substrate is thinner than the thickness of the center portion of the second substrate by 40% to 60%.

3. The curved liquid crystal display of claim 1, wherein the first upper removed portion extends from an upper surface of the second substrate to the side surface of the second substrate.

4. The curved liquid crystal display of claim 3, wherein the sealant is disposed below the first upper removed portion.

5. The curved liquid crystal display of claim 4, wherein a thickness of a side surface of the first substrate is thinner than a thickness of a center portion of the first substrate.

6. The curved liquid crystal display of claim 5, wherein the first lower removed portion extends from a lower surface of the first substrate to the side surface of the first substrate.

7. The curved liquid crystal display of claim 6, wherein the second substrate further includes a second lower removed portion facing the first upper removed portion.

8. The curved liquid crystal display of claim 7, wherein the second lower removed portion extends from the lower surface of the second substrate to the side surface of the second substrate.

9. The curved liquid crystal display of claim 8, wherein the first substrate further includes a second upper removed portion facing the first lower removed portion.

10. The curved liquid crystal display of claim 9, wherein the second upper removed portion extends from the upper surface of the first substrate to the side surface of the first substrate.

11. The curved liquid crystal display of claim 10, wherein the sealant contacts the second upper removed portion and the second lower removed portion.

\* \* \* \* \*